(12) United States Patent
Thiel

(10) Patent No.: US 7,992,684 B2
(45) Date of Patent: Aug. 9, 2011

(54) DEVICE FOR SEALING ESCALATOR OR MOVING WALKWAY DRIVES

(75) Inventor: Alfred Thiel, Sprockhövel (DE)

(73) Assignee: Kone Corporation, Helsinki (FI)

( * ) Notice: Subject to any disclaimer, the term of this patent is extended or adjusted under 35 U.S.C. 154(b) by 302 days.

(21) Appl. No.: 11/489,727

(22) Filed: Jul. 20, 2006

(65) Prior Publication Data

US 2007/0169998 A1    Jul. 26, 2007

Related U.S. Application Data

(63) Continuation of application No. PCT/DE2004/002774, filed on Dec. 18, 2004.

(30) Foreign Application Priority Data

Jan. 20, 2004    (DE) .......................... 10 2004 002 836

(51) Int. Cl.
*F16N 25/00* (2006.01)
(52) U.S. Cl. ............................ 184/12; 198/330; 277/908
(58) Field of Classification Search ................. 184/6.18, 184/12, 15.1; 277/630, 908; 198/330
See application file for complete search history.

(56) References Cited

U.S. PATENT DOCUMENTS

| 4,437,673 A | 3/1984 | Miyamoto |
| 6,077,050 A * | 6/2000 | Beck .............................. 417/269 |
| 6,758,480 B1 * | 7/2004 | Thiel ............................. 277/630 |
| 2008/0169157 A1 * | 7/2008 | Wyker et al. ................. 184/6.16 |

FOREIGN PATENT DOCUMENTS

| JP | 58-84269 A | 5/1983 |
| WO | WO 00/25047 A | 5/2000 |

* cited by examiner

*Primary Examiner* — Robert Siconolfi
*Assistant Examiner* — Vu Q Nguyen
(74) *Attorney, Agent, or Firm* — Venable LLP; Robert Kinberg; Ryan M. Flandro

(57) ABSTRACT

The invention relates to an escalator or moving walkway that includes a drive shaft rotating at a relatively low peripheral speed around a horizontal axis and at least one sealing element associated with the drive shaft. Lubricant is supplied to the drive shaft and can escape from leakages at the one sealing element. A device is provided for a permanent recirculation of the lubricant escaping from the leakages. The device includes at least one conveyor element arranged downstream of the sealing element, seen in the direction of the leakage, and at least one recirculation element for the lubricant. The recirculation element cooperates with the conveyor element to return the lubricant into a region upstream of the at least one sealing element.

21 Claims, 3 Drawing Sheets

DEVICE FOR SEALING ESCALATOR OR MOVING WALKWAY DRIVES

CROSS-REFERENCE TO RELATED APPLICATIONS

This application is a continuation of International Application No. PCT/DE2004/002774 filed Dec. 18, 2004 designating the United States and claiming priority from German Application No. DE 10 2004 002 836.2 filed Jan. 20, 2004, the disclosure of both applications being incorporated herein by reference.

BACKGROUND OF THE INVENTION

The invention relates to a device for the permanent recirculation of lubricant escaping from leakages at sealing elements of an escalator or moving walkway drive.

Drives of escalators and moving walkways are notable for low peripheral speeds that are due to the fact that the respective escalator or the respective moving walkway may only be operated at a low transport speed for safety reasons. Maximum peripheral speeds of only 20 rotations/minute are often achieved at the driven shaft. For sealing against escaping lubricant, usually dynamically acting seals, such as for example rotary shaft seals are used. It has been found that such sealing elements often fail after only two or three years of operational use, and to repair them divided sealing elements that are glued to the corresponding structural components are often used. However, such a repair often fails after only a few days.

SUMMARY OF THE INVENTION

Because the manufacturers of sealing elements have not been able so far to provide corresponding solutions for sealing such drives, it is an object of the present invention to provide a solution to permanently solve the mentioned problem for escalators or moving walkways.

The above and other objects are accomplished according to an exemplary embodiment of the invention, wherein in the context of an escalator or moving walkway including a shaft rotating at a relatively low peripheral speed around a horizontal axis and at least one sealing element associated with the shaft, wherein lubricant is supplied to the shaft and escapes from leakages at the at least one sealing element, there is provided a device for a permanent recirculation of the lubricant escaping from the leakages, the device including at least one conveyor element arranged downstream the sealing element, seen in the direction of the leakage, and at least one recirculation element for the lubricant, the recirculation element cooperating with the conveyor element to return the lubricant into a region upstream of the at least one sealing element.

According to an exemplary embodiment, the recirculation element is provided in the form of a sleeve located radially outside the sealing element and is equipped with a wedge shaped stripping element. The stripping element projects over a limiting edge of the sleeve and sits close with predetermined contact pressure on the opposing face of the conveyor element.

The invention thus provides a system that is both independent of the type of sealing element and from the type of lubricant, and that serves for the permanent recirculation of lubricant escaping from leakages into the region of the lubricant space.

It has been found to be a problem to use rotary shaft seals for sealing synthetic lubricant, for example lubricants based on polyglycol, since polyglycols have to be considered as unfavourable lubricants with respect to a reliable sealing. A sealing element based on NBR (Nitrile-Butadiene-Rubber) is assumed to be more suitable, but is not considered as well suited, or even a very well suitable material for sealing purposes. HNBR (Hydrogenated Acrylonitrile) is slightly more favourable than NBR. Because manufacturers do not possess any materials that are in particular suitable for efficiently sealing for example polyglycol lubricants, the system according to the invention is a useful alternative for permanently handling occurring leakages.

The solution according to the invention can be used in a meaningful way even if the sealing element is highly damaged, thus delaying the time of a possible exchange of the sealing element, whereby the service life of an escalator or moving walkway drive can be considerably increased. Repair is either not necessary at all, or only very seldom required. If repair is necessary, generally only the sleeve has to be exchanged due to eventual wear of the wedge, whereby such wedge wear causes the wedge no longer sit with the predetermined contact pressure on the conveyor element in order to provoke a corresponding stripping effect.

At first the wedge sits closely with predetermined contact pressure on the opposing face of the conveyor element. If the pre-stress force decreases due to abrasion, micro-gaps can form between the wedge and the conveyor element. Such micro-gaps do not by themselves lead to the exchange of the sleeve, since the lubricant is usually viscous and is thus present as a thicker film on the conveyor element, which film can nevertheless still be stripped off.

The subject invention thus forms a tight system with respect to the outside, despite actual leakages. If sealing elements based on NBR or HNBR are not considered sufficient for the problematic synthetic lubricants, sealing elements based on PTFE (Polytetrafluorethylen) or PTFE compounds can be used, since such sealing elements show lesser compatibility problems with synthetic lubricants.

BRIEF DESCRIPTION OF THE DRAWINGS

The subject of invention is described below in conjunction with an exemplary embodiment illustrated in the accompanying drawings, wherein.

DETAILED DESCRIPTION OF AN EXEMPLARY EMBODIMENT

Figure 1:
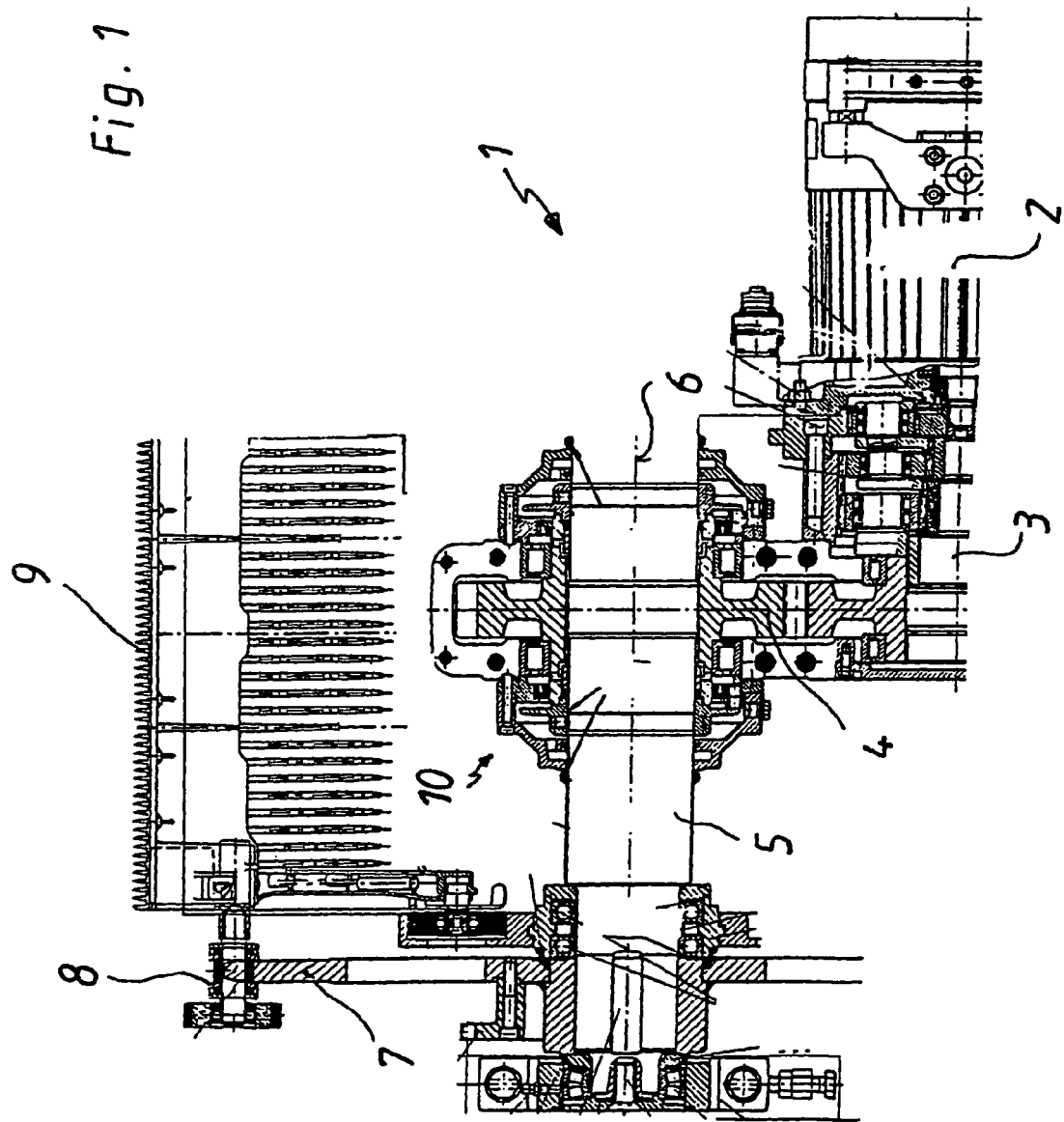
FIG. 1 is a partial sectional representation of a drive of an escalator or a moving walkway.

FIG. 1 shows a sectional view of a drive 1 that can be used for an escalator or a moving walkway. Shown are a drive motor 2, a gear 3 as well as a reducing gear 4 for reducing the peripheral speed of the drive shaft 5 which can be rotated around a horizontal axis 6. Furthermore, a chain wheel 7 is visible for reversing the steps or pallets 9 of the no further represented escalator or the no further represented moving walkway that cooperate with a drive mechanism 8. The region to be sealed is indicated by the reference numeral 10 and will be explained in detail in FIG. 2.

Figure 2:
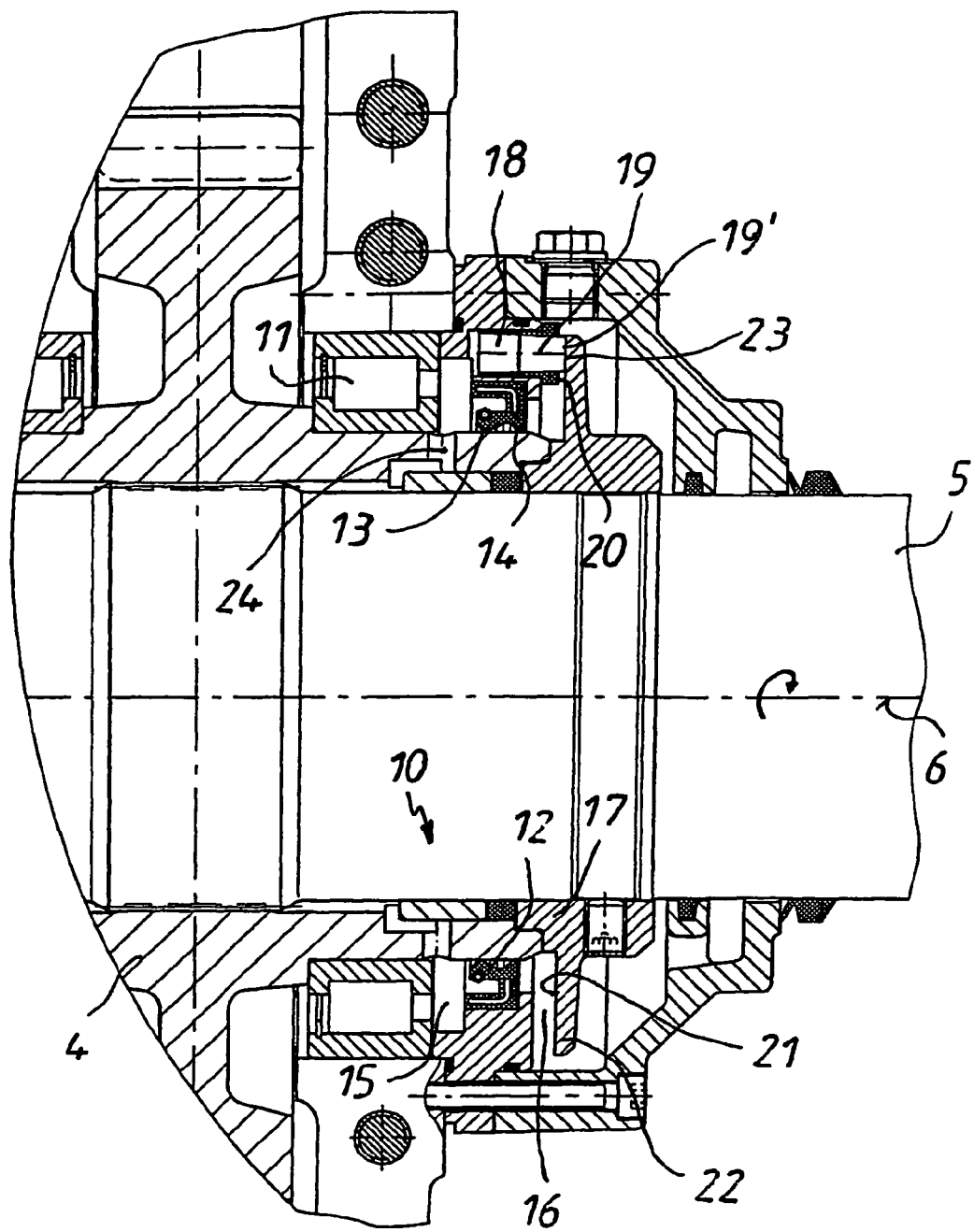
FIG. 2 is a schematic sectional view of the shaft region to be sealed of the drive represented in FIG. 1.

FIG. 2 shows the region to be sealed 10 according to FIG. 1, wherein the reducing gear 4, the drive shaft 5 and the horizontal axis 6 are visible. Also shown are a bearing 11, a sealing element 12, that is a rotary shaft seal in this example and that comprises a main sealing lip 13 and a secondary sealing lip 14. A lubricant space is indicated by reference numeral 15. For the lubrication of the reducing gear 4 on the one hand and of the bearing 11 on the other hand, the space 15 is filled with lubricant, for example a synthetic lubricant. Of course, any other lubricant can also be used. Similarly, the sealing element 12 may be of another type, for example an axial face seal or a labyrinth seal. If the main sealing lip 13 as well as the secondary sealing lip 14 are leaky, lubricant gets into a leakage region 16 and would escape in a relatively short period of time and lead to contamination of the steps or pallets 9 represented in FIG. 1, which would entail a periodic need of cleaning.

In order to avoid such consequences, the present invention provides a device for the permanent recirculation of lubricant escaping from such a leakage at the sealing element 12 that is described in detail in the following.

In particular, a conveyor element 17 is shown arranged downstream of the sealing element 12. Conveyor element 17 is a disk in this example that is firmly connected to the shaft 5 and thus rotates with shaft 5. A recirculation element in the form of a sleeve 18 is located radially outside the sealing element 12 and is equipped with a wedge shaped stripping element 19. The stripping element 19 projects over a limiting edge 20 of sleeve 18 and sits close with predetermined contact pressure on the opposing face 21 of the conveyor element 17.

When the leakage region 16 fills with leaking lubricant such that the radial leg 22 of the conveyor element 17 immerses therein, the lubricant is taken along in the direction of the circumference and is stripped from the face 21 by the stripping element 19, wherein the leakage lubricant is returned to the region 24 upstream of the sealing element 12 via a discharge slope 23 of the sleeve 18.

As a result of this measure, greater leakages of the sealing element 12 can be accepted over a longer time without repair work being necessary. The service life of the drive 1 according to FIG. 1 can thus be considerably increased. In case of wear of the stripping edge 19' of stripping element 19 micro-gaps are formed. Due to the viscous character of the lubricant the lubricant film adhering to the conveyor element 17 is thicker than the micro-gaps, such that, in spite of wear, a good stripping effect can be nevertheless achieved.

Figure 3:
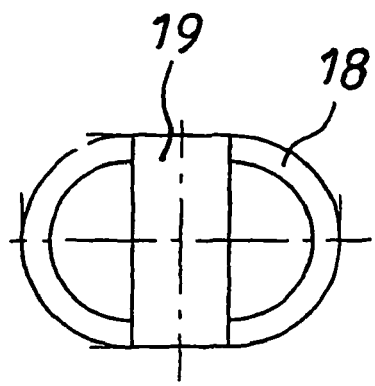
FIGS. 3a-3c show different views of a representation of the recirculation element according to FIG. 2.
Figure 3:
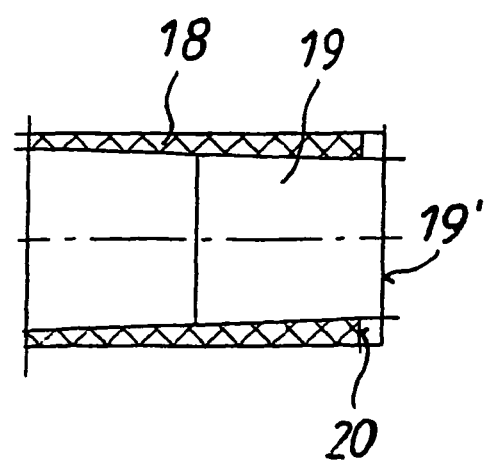
Figure 3:
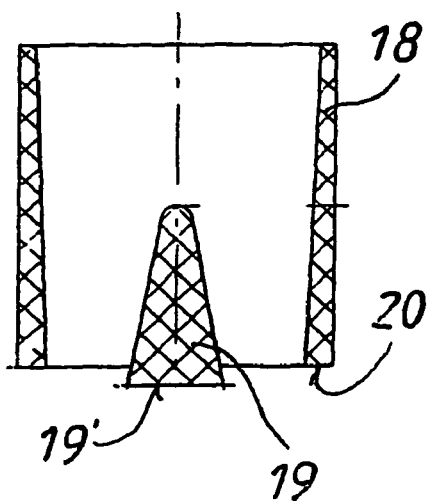

FIGS. 3a-3c show different views of the sleeve 18 in connection with the wedge shaped stripping element 19. The stripping edge 19' projects with a predetermined length over the limiting edge 20 of the sleeve 18.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. In an escalator or moving walkway including a drive shaft rotating around a horizontal axis and at least one sealing element associated with the drive shaft, wherein lubricant is supplied to the drive shaft and escapes from leakages at the at least one sealing element, the improvement comprising:
    a device for a permanent recirculation of the lubricant escaping from the leakages, the device including:
        at least one conveyor element having a radial leg firmly connected to the drive shaft and arranged downstream of the sealing element, seen in the direction of the leakage, wherein the radial leg defines an opposing face and is configured to immerse in lubricant disposed in a leakage region as the drive shaft rotates around the horizontal axis; and
        at least one recirculation element for the lubricant, the recirculation element comprising at least one stripping element in contact with the opposing face of the radial leg to strip the lubricant from the opposing face and return the lubricant stripped from the opposing face into a region upstream of the at least one sealing element, wherein the stripping element is non-annular relative to the horizontal axis.

2. The device according to claim 1, wherein the sealing element is a dynamically acting rotary shaft seal having at least one sealing lip.

3. The device according to claim 2, wherein the sealing element comprises nitrile butadiene rubber (NBR), hydrogenated acrylonitrile-butadiene rubber (HNBR), or polytetrafluoroethylene (PTFE).

4. The device according to claim 1, wherein the lubricant comprises a synthetic lubricant.

5. The device according to claim 1, wherein the conveyor element comprises a disk defining the radial leg and rotating with the drive shaft and which transports adhering lubricant from the leakage region towards the recirculation element.

6. The device according to claim 1, wherein the recirculation element comprises at least one sleeve, whereby the lubricant stripped by the stripping element from the opposing face is returned via the sleeve into the region upstream of the at least one sealing element.

7. The device according to claim 6, wherein the sleeve has a limiting edge and the stripping element has a stripping edge that projects over the limiting edge of the sleeve to contact the opposing face of the radial leg, wherein the stripping edge is seated with predetermined contact pressure against the opposing face of the radial leg.

8. The device according to claim 7, wherein the sleeve is arranged radially outside the sealing element and the stripping edge of the stripping element contacts the opposing face of the radial leg in an outer radial region thereof.

9. The device according to claim 6, wherein the sleeve comprises a material resistant to lubricant.

10. The device according to claim 6, wherein the sleeve has an axial length that approximately corresponds to an axial construction length of the sealing element, and wherein the sleeve includes a discharge slope for the returned lubricant that points into the direction of the sealing element.

11. The device according to claim 1, wherein the recirculation element comprises:
    a sleeve having first and second openings and an inner surface defining a discharge slope for the stripped lubricant that returns the lubricant into the region upstream of the sealing element, and wherein the stripping element comprises a wedge-shaped stripping element disposed in the first opening of the sleeve and having a stripping edge seated with predetermined contact pressure against the opposing face of the radial leg to strip the lubricant therefrom.

12. The device according to claim 1, wherein the stripping element comprises a stripping edge having a width and seated with predetermined contact pressure against the opposing face of the radial leg over a limited angular extent thereof to strip the lubricant therefrom as the radial leg rotates past the stripping edge.

13. An apparatus comprising:
    a shaft arranged to rotate around a horizontal axis;

at least one sealing element associated with the shaft, wherein lubricant is supplied to the shaft and escapes from leakages at the sealing element into a leakage region;

a conveyor element having a radial leg firmly connected to the shaft and arranged downstream of the sealing element, seen in the direction of the leakage, the radial leg defining an opposing face configured to immerse in lubricant disposed in the leakage region as the shaft rotates around the horizontal axis; and a recirculation element for the lubricant escaping from leakage at the sealing element, the recirculation element comprising at least one stripping element in contact with the opposing face of the radial leg to strip the lubricant from the opposing face and return the lubricant stripped from the opposing face into a region upstream of the sealing element, wherein the stripping element is non-annular relative to the horizontal axis.

14. The apparatus according to claim 13, wherein the sealing element is a dynamically acting rotary shaft seal having at least one sealing lip.

15. The apparatus according to claim 13, wherein the conveyor element comprises a disk defining the radial leg and rotating with the shaft and which transports adhering lubricant from the leakage region towards the recirculation element.

16. The apparatus according to claim 13, wherein the recirculation element comprises at least one sleeve, whereby the lubricant stripped by the stripping element from the opposing face is returned via the sleeve into the region upstream of the at least one sealing element.

17. The apparatus according to claim 16, wherein the sleeve has a limiting edge and the stripping element has a stripping edge that projects over the limiting edge of the sleeve to contact the opposing face of the radial leg, and wherein the stripping edge is seated with predetermined contact pressure against the opposing face of the radial leg.

18. The apparatus according to claim 17, wherein the sleeve is arranged radially outside the sealing element and the stripping edge of the stripping element contacts the opposing face of the radial leg in an outer radial region thereof.

19. The apparatus according to claim 16, wherein the sleeve has an axial length that approximately corresponds to an axial construction length of the sealing element, and wherein the sleeve includes a discharge slope for the returned lubricant that points into the direction of the sealing element.

20. The apparatus according to claim 13, wherein the recirculation element comprises:

a sleeve having first and second openings and an inner surface defining a discharge slope for the stripped lubricant that returns the lubricant into the region upstream of the sealing element, and wherein the stripping element comprises a wedge-shaped stripping element disposed in the first opening of the sleeve and having a stripping edge seated with predetermined contact pressure against the opposing face of the radial leg to strip the lubricant therefrom.

21. The apparatus according to claim 13, wherein the stripping element comprises a stripping edge having a width and seated with predetermined contact pressure against the opposing face of the radial leg over a limited angular extent thereof to strip the lubricant therefrom as the radial leg rotates past the stripping edge.

* * * * *